(12) United States Patent
Abrams et al.

(10) Patent No.: US 8,977,646 B2
(45) Date of Patent: Mar. 10, 2015

(54) LEVERAGING GRAPH DATABASES IN A FEDERATED DATABASE SYSTEM

(75) Inventors: Howard A. Abrams, San Mateo, CA (US); Mark J. Addleman, San Francisco, CA (US)

(73) Assignee: CA, Inc., New York, NY (US)

( * ) Notice: Subject to any disclaimer, the term of this patent is extended or adjusted under 35 U.S.C. 154(b) by 32 days.

(21) Appl. No.: 13/517,821

(22) Filed: Jun. 14, 2012

(65) Prior Publication Data

US 2013/0339385 A1    Dec. 19, 2013

(51) Int. Cl.
*G06F 17/30*        (2006.01)

(52) U.S. Cl.
USPC .......................................... 707/770

(58) Field of Classification Search
CPC ............ G06F 17/30545; G06F 17/30424; G06F 17/30539
See application file for complete search history.

(56) References Cited

U.S. PATENT DOCUMENTS

| | | | |
|---|---|---|---|
| 2011/0289055 A1* | 11/2011 | Pothering et al. | 707/626 |
| 2012/0096043 A1* | 4/2012 | Stevens, Jr. | 707/798 |
| 2012/0158653 A1* | 6/2012 | Shaffer et al. | 707/622 |
| 2013/0268533 A1* | 10/2013 | Komarov | 707/740 |

OTHER PUBLICATIONS

Soussi, et al., "Graph Database for Collaborative Communities", 30 pages.

* cited by examiner

*Primary Examiner* — Rehana Perveen
*Assistant Examiner* — Alexander Khong
(74) *Attorney, Agent, or Firm* — Baker Botts L.L.P.

(57) ABSTRACT

A method includes receiving a database query for a first database and determining whether a second database contains data responsive to the database query, wherein the second database comprises a graph database. The method also includes retrieving responsive data from a memory device associated with the second database if it is determined that the second database contains data responsive to the database query. The method further includes responding to the database query by providing the responsive data.

27 Claims, 3 Drawing Sheets

LEVERAGING GRAPH DATABASES IN A FEDERATED DATABASE SYSTEM

BACKGROUND

The present disclosure relates generally to federated databases, and more specifically, to leveraging graph databases in a federated database system.

A federated database system is a database management system (DBMS) that integrates access to multiple autonomous data sources, such as relational database management systems, files, and/or web services, without physically merging the data sources. The federated database system provides virtualized access to the autonomous data sources by retrieving data from the appropriate data sources as necessary to respond to database queries. In this manner, the autonomous data sources are integrated into a single virtual database, commonly known as a federated database, allowing the constituent data sources to be accessed using a single database query.

BRIEF SUMMARY

According to one aspect of the present disclosure, a method includes receiving a database query for a first database and determining whether a second database contains data responsive to the database query, wherein the second database comprises a graph database. The method also includes retrieving responsive data from a memory device associated with the second database if it is determined that the second database contains data responsive to the database query. The method further includes responding to the database query by providing the responsive data.

According to another aspect of the present disclosure, a system includes an interface operable to receive a database query for a first database and a processor operable to determine whether a second database contains data responsive to the database query, wherein the second database comprises a graph database. The processor is also operable to retrieve responsive data from a memory device associated with the second database if it is determined that the second database contains data responsive to the database query. The processor is further operable to respond to the database query by providing the responsive data.

According to yet another aspect of the present disclosure, a computer program product includes a computer readable storage medium with computer readable program code. The computer readable program code includes computer readable program code configured to receive a database query for a first database and determine whether a second database contains data responsive to the database query, wherein the second database comprises a graph database. The computer readable program code also includes computer readable program code configured to retrieve responsive data from a memory device associated with the second database if it is determined that the second database contains data responsive to the database query. The computer readable program code further includes computer readable program code configured to respond to the database query by providing the responsive data.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely by hardware, entirely by software (including firmware, resident software, micro-code, etc.) or by a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible and/or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel; JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Figure 1:
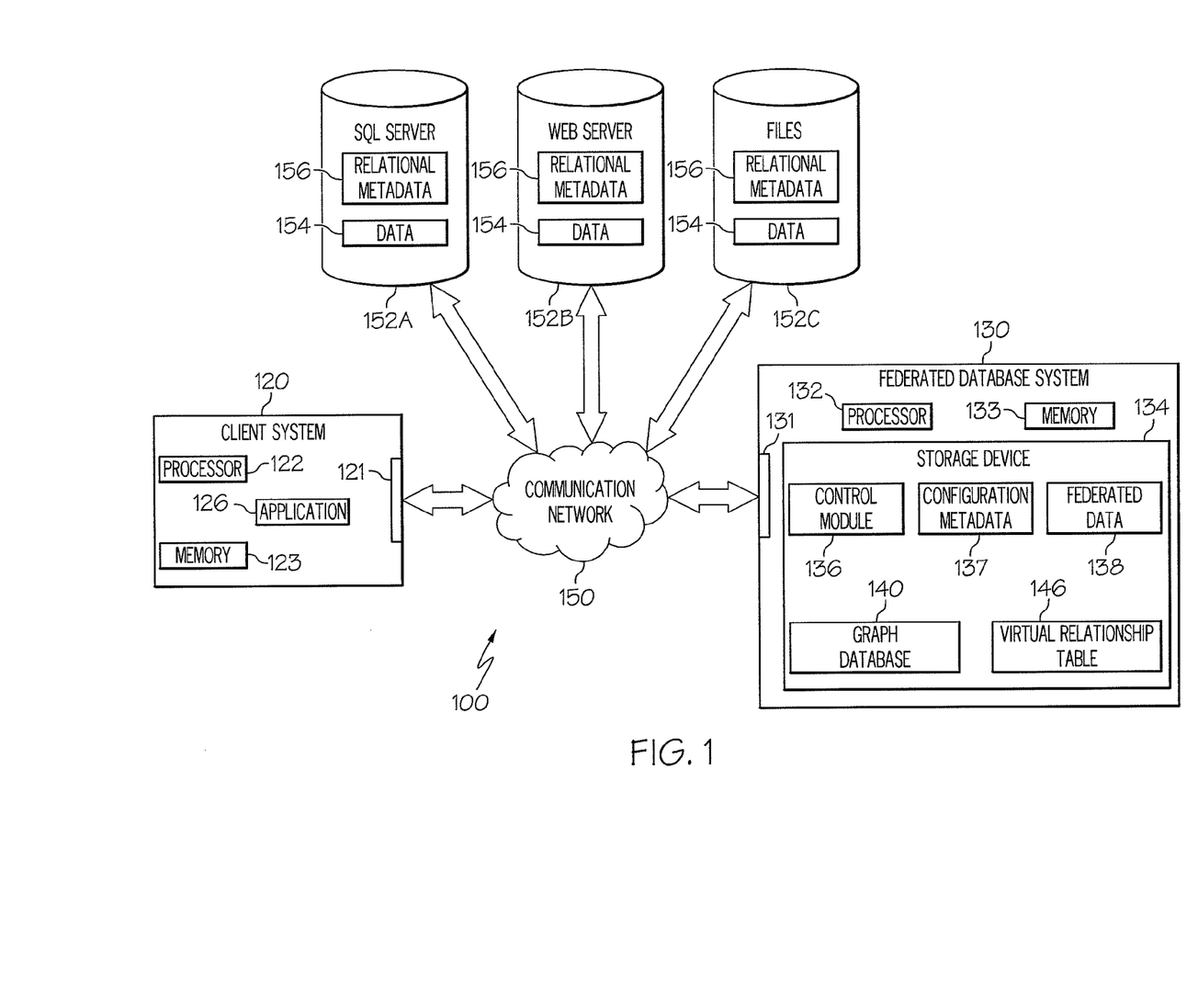
FIG. 1 illustrates a system for leveraging graph databases in a federated database system, in accordance with a particular embodiment.

Referring now to FIG. 1, an example embodiment of a system 100 for leveraging graph databases in a federated database system is illustrated. The illustrated embodiment includes client system 120, federated database system 130, communications network 150, and data sources 152. In the illustrated embodiment, federated database system 130 is a database system capable of integrating multiple autonomous data sources 152 without physically merging the data sources 152. For example, federated database system 130 may provide virtualized access to data sources 152 by retrieving data 154 from the appropriate data sources 152 as necessary to respond to database queries. However, in some embodiments, other database systems 130 may be used, such as a relational or object-relational database system. In the illustrated embodiment, federated database system 130 leverages a graph database 140 for responding to database queries.

Federated database system 130 may be a database management system (DBMS) configured to integrate data 154 from multiple autonomous data sources 152 into a single virtual database. In the illustrated embodiment, federated database system 130 is communicatively coupled to client system 120 and data sources 152 using communications network 150. In other embodiments, federated database system 130 may be implemented locally on client system 120 and/or data sources 152. In the illustrated embodiment, federated database system 130 includes an interface 131, processor 132, memory 133, and storage device 134. Interface 131 may include any suitable hardware, software or encoded logic for transmitting and/or receiving communication signals to and from one or more communications networks, such as communications network 150. Interface 131 may facilitate communications between federated database system 130 and client system 120 and/or data sources 152. Processor 132 may be a microprocessor, controller, or any other suitable computing device, resource, or combination of hardware, software and/or encoded logic operable to perform functionality associated with federated database system 130. Memory 133 may be any form of volatile or non-volatile memory including, without limitation, magnetic media, optical media, random access memory (RAM), read-only memory (ROM), removable media, or any other suitable local or remote memory component, for storing information associated with the functionality discussed herein. Storage device 134 may be any suitable resource for storing data and/or other information, including, without limitation, a magnetic disk, flash memory, optical disk, or any other suitable local or remote data storage device. In the illustrated embodiment, configuration metadata 137, graph database 140, and relationship table 146 are stored on storage device 134, as well the data and/or instructions associated with control module 136.

Client system 120 may communicate with federated database system 130 to access data 154 of data sources 152. Client system 120 may comprise any suitable hardware, software or encoded logic for performing the functionality described herein as associated with client system 120. In the illustrated embodiment, client system 120 includes an interface 121, processor 122, memory 123, and application 126. Interface 121 may include any suitable hardware, software or encoded logic for transmitting and/or receiving communication signals to and from one or more communications networks, such as communications network 150. Interface 121 may facilitate communications between client system 120 and federated database system 130 through communications network 150. Processor 122 may be a microprocessor, controller, or any other suitable computing device, resource, or combination of hardware, software and/or encoded logic operable to perform functionality associated with client system 120. Memory 123 may be any form of volatile or non-volatile memory including, without limitation, magnetic media, optical media, random access memory (RAM), read-only memory (ROM), removable media, or any other suitable local or remote memory component, for storing information associated with the functionality discussed herein.

Application 126 of client system 120 may execute on processor 122 and may submit database queries to federated database system 130. Application 126 may also receive data from federated database system 130 in response to the database queries. Application 126 may be any suitable combination of hardware, software and/or encoded logic capable of performing the functionality described herein when executed by processor 122. In particular embodiments, application 126 may be a business application configured to provide one or more business services. As an example, application 126 may be a mainframe management application configured to provide security, network, and/or database administration services. A particular business service may require access to data 154 of one or more of the data sources 152, which may be accomplished by querying federated database system 130.

Communications network 150 may facilitate communications among client system 120, federated database system 130, and/or data sources 152. Communications network 150 may be any interconnection of components capable of transmitting communication signals, data, and/or messages, such as a local area network (LAN), wide area network (WAN), global distributed network (e.g., the Internet), Intranet, Extranet, or any other form of wireless or wireline communication network.

Data sources 152 may include any suitable resources for storing information, such as data 154 and/or associated relational metadata 156. For example, data sources 152 may include, without limitation, a database or database server (e.g., an SQL database or server), a web service provided by a web-server, and/or one or more files stored using the file system of a storage device (e.g., a text file, CSV file, or spreadsheet). In the illustrated embodiment, data sources 152 are communicatively coupled to federated database system 130 and client system 120 over communications network 150. In other embodiments, data sources 152 may be implemented locally on client system 120 and/or federated database system 130.

In particular embodiments, federated database system 130 may be implemented with functionality of a relational database and/or object-relational database. A relational database and/or object-relational database may comprise data 154 stored in tables and may also include relational metadata 156 describing the data 154 stored in the tables. In particular embodiments, the relational metadata 156 may define objects with one or more properties, and the tables may store instances of each defined object. For example, each row of a table may contain data 154 associated with an instance of an object, and the columns may correspond to the properties of the object. A relational or object-relational database may be capable of performing various actions on the data 154 stored in the tables, including searching the data 154 based on specified criteria and/or combining data 154 from multiple tables. Searching an SQL database may be performed using a "select" command. Data 154 from multiple tables may be combined by joining specific columns from each table. This may be performed on an SQL database using a "join" command. Multiple tables may also be combined by merging the rows of each table into single table. This may be performed on an SQL database using a "union" command.

Federated database system 130 may provide virtualized access to data sources 152 by retrieving data 154 from the appropriate data sources 152 as necessary to respond to database queries. In particular embodiments, configuration metadata 137 may define the manner in which data sources 152 are integrated. For example, configuration metadata 137 may describe a set of "virtual" federated data 138 as one or more tables with one or more columns whose underlying data 154 is supplied by various data sources 152. In such embodiments, each table may represent an object and each column may represent the properties of the object. Configuration metadata 137 may specify the data sources 152 that supply the data 154 necessary to populate a particular table and/or column, and configuration metadata 137 may also define the relationships among the tables and/or objects of federated data 138. As an example, configuration metadata 137 may define federated data 138 as one or more objects having one or more properties, and configuration metadata 137 may specify that certain objects and/or properties are populated by a data source 152 implemented by an SQL server, while other objects and/or properties are populated by a data source 154 implemented by a web service. In this example, configuration metadata 137 may specify the authentication credentials for the SQL server and may specify the URL for the web service. Although federated database system 130 may store and maintain its own set of configuration metadata 137, the underlying data 154 and/or relational metadata 156 may be stored on data sources 152 rather than federated database system 130. In this manner, federated database system 130 may "virtualize" access to data sources 152 by retrieving data 154 and/or associated relational metadata 156 from the appropriate data sources 152 as necessary for responding to database queries.

Upon receiving a database query from client system 120, federated database system 130 may consult configuration metadata 137 to identify the data sources 152 that contain the underlying data 154 (e.g., data sources 152*a*, 152*b*, 152*c*) necessary to respond to the database query. For each identified data source 152, federated database system 130 may generate one or more subqueries and may transmit the subqueries to the appropriate data sources 152. Upon receiving the subqueries, data sources 152 may retrieve data 154 responsive to the subqueries and may transmit the responsive data 154 to federated database system 130. Federated database system 130 may then integrate the received data 154 and may provide the integrated data to client system 120 in response to the database query from client system 120. In some embodiments, federated database system 130 may consult configuration metadata 137 to determine how to integrate data 154 received from each data source 152. For example, configuration metadata 137 may specify the data 154 of each data source 152 that is used to populate each object and/or associated properties of federated data 138, and federated database system 130 may integrate the data 154 accordingly.

Responding to database queries in this manner may often be a time-consuming and inefficient process, particularly for frequently executed queries that require data 154 from numerous data sources 152 to be retrieved and integrated. Thus, in particular embodiments, federated database system 130 may leverage a graph database 140 to improve the performance of responding to database queries. For example, when retrieving and integrating data from data sources 152 in response to a database query, federated database system 130 may cache the retrieved data and associated relationships in graph database 140. Upon receiving a subsequent database query involving the previously cached data, federated database system 130 may respond to the database query using the cached data from graph database 140 rather than re-retrieving and integrating the appropriate data and associated relationships from the respective data sources 152.

A graph database 140 may represent data using a set of nodes and edges where the nodes represent objects and the edges represent the relationships among objects. Graph databases may be advantageous over relational databases for data sets consisting primarily of many-to-many relationships among objects, as graph databases do not typically require the expensive "join" operations associated with relational databases. Graph databases also typically provide more flexibility in defining relationships among the objects. For example, in relational databases, relationships may typically be defined using a "join" operation and/or by creating a new table to represent the relationship. In graph databases, on the other hand, relationships may be defined between any existing nodes in the graph structure by simply adding an edge representing the relationship between the nodes. Graph databases may also facilitate the identification of connections, patterns, and relationships among objects.

In embodiments that leverage a graph database 140, federated database system 130 may first consult graph database 140 upon receiving a database query to determine whether the data 154 necessary to respond to the database query has already been cached in graph database 140. If that data 154 has already been cached in graph database 140, federated database system 130 may use the cached data 154 from graph database 140 to respond to the database query. However, if the data 154 necessary to respond to the database query has not been cached in graph database 140, federated database system 130 may respond to the database query in the typical manner by retrieving and integrating data 154 from the appropriate data sources 152 and providing the integrated data 154 in response to the database query. Federated database system 130 may then cache the retrieved data 154 in graph database 140 by populating graph database 140 with the retrieved data 154, including any objects that may be represented by the data 154 and any relationships among those objects. In this manner, upon receiving a subsequent database query involving this previously cached data 154, federated database system 130 may respond to the database query using the data 154 cached in graph database 140 rather than re-retrieving and integrating the data 154 from the respective data sources 152. In this manner, particular embodiments may allow graph queries to be performed on relational data 154 and may result in increased performance when responding to frequently executed database queries, while maintaining the performance of responding to traditional relational database queries. Particular embodiments may also provide flexibility in defining relationships among relational data 154 without the need to generate a new database schema or modify the existing relational data 154. The ability to leverage graph databases 140 in this manner may result in increased performance and flexibility in a database system, such as a federated database system 130.

In particular embodiments, federated database system 130 may leverage a virtual relationship table 146 in conjunction with graph database 140. In such embodiments, virtual relationship table 146 may be maintained and/or stored by federated database system 130 and may be used to store relationships among objects of the data 154 stored on data sources 152. For example, virtual relationship table 146 may be used to map the primary key for a particular row in a table of data 154 to the primary key for a particular row in another table through a named relationship. When a relationship is added to virtual relationship table 146, the relationship may also be added to graph database 140. For example, nodes representing the objects corresponding to each primary key may be inserted into graph database 140 if they do not already exist in graph database 140, and a new edge representing the relationship may be inserted between the two nodes. In this manner, virtual relationship table 146 may provide greater flexibility in defining relationships by allowing relationships to be defined without modifying the underlying database schema.

When federated database system 130 receives a database query, federated database system 130 may first query the virtual relationship table 146 to determine whether the database query is requesting a relationship that is explicitly represented in virtual relationship table 146. If the database query is requesting a relationship that is explicitly represented in virtual relationship table 146, federated database system 130 may use the primary keys in virtual relationship table 146 to query for the corresponding nodes in graph database 140. Federated database system 130 may then respond to the database query using the data retrieved from graph database 140. If the database query is requesting a relationship that is not explicitly defined in virtual relationship table 146, federated database system 130 may query graph database 140 to determine if the relationship is implicitly represented in graph database 140. If graph database 140 does not contain data 154 representing the queried relationship, federated database system 130 may retrieve and integrate data 154 from the appropriate data sources 152. Federated database system 130 may then add the relationship associated with the integrated data 154 into virtual relationship table 146 and may cache the integrated data 154 into graph database 140. Because the relationship may now explicitly be represented in virtual relationship table 146, federated database system 130 may then respond to the database query in the manner described above for relationships explicitly represented in virtual relationship table 146. Leveraging both virtual relationship table 146 and graph database 140 in this manner may allow federated database system 130 to query for cached data 154 using relational queries to the virtual relationship table 146 and/or using graph queries directly to graph database 140, as appropriate. For example, a database query to identify computer systems with particular CPU load percentages may execute more efficiently using relational queries, while a database query to identify the highest network latency between the shortest path between two computers may execute more efficiently using graph queries.

In particular embodiments, when the underlying data 154 stored on data sources 152 is updated and/or modified, the corresponding data 154 cached in graph database 140 may become out of date. Accordingly, particular embodiments may include functionality to update graph database 140 to accurately reflect any corresponding updates to the underlying data 154 stored on data sources 152. For example, in particular embodiments, data 154 cached in graph database 140 may expire after a pre-determined amount of time. If federated database system 130 determines that data 154 cached in graph database 140 has expired, federated database system 130 may decline to use the cached data 154. Instead, federated database system 130 may re-retrieve the underlying data 154 from the appropriate data sources 152 and may then update graph database 140 with the retrieved data 154. In such embodiments, a timer or timestamp may be used to determine when data 154 cached in graph database 140 has expired. As another example, federated database system 130 may implement publish-subscribe functionality to ensure that data 154 cached in graph database 140 does not become out of date. In such embodiments, federated database system 130 may "subscribe" to the data sources 152 that provide the underlying data 154 cached in graph database 140. If the data 154 stored on a particular data source 152 is updated and/or modified, the data source 152 may "publish" the update to federated database system 130 as well as any other resources that have "subscribed" to receiving this information. In this manner, federated database system 130 may be informed by the respective data sources 152 when the underlying data 154 stored on data sources 152 is updated and/or modified.

Figure 2:
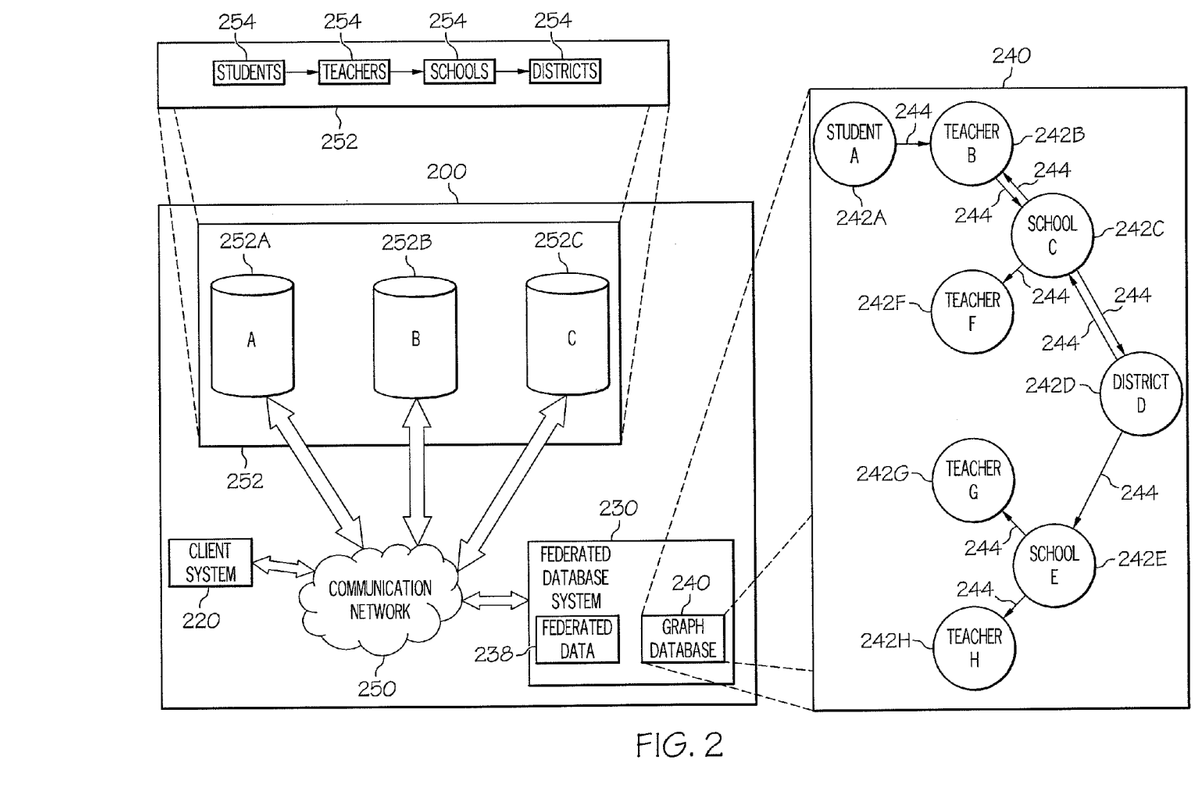
FIG. 2 illustrates exemplary aspects of a graph database in a system for leveraging graph databases in a federated database system, in accordance with a particular embodiment.

FIG. 2 illustrates exemplary aspects of a graph database 240 in a system 200 for leveraging graph databases in a federated database system. The illustrated embodiment includes client system 220, federated database system 230, graph database 240, communications network 250, and data sources 252. Federated database system 230 may provide virtualized access to multiple autonomous data sources 252 by retrieving data from the appropriate data sources 252 as necessary to respond to database queries. Federated database system 230 may be similar to federated database system 130 of FIG. 1, client system 220 may be similar to client system 120 of FIG. 1, graph database 240 may be similar to graph database 140 of FIG. 1, data sources 252 may be similar to data sources 152 from FIG. 1, and communications network 250 may be similar to communications network 150 of FIG. 1. In the illustrated embodiment, federated database system 230 leverages a graph database 240 when responding to database queries. For example, when retrieving and integrating data from data sources 252 in response to a database query, federated database system 230 may cache the retrieved data and associated relationships in graph database 240. Upon receiving a subsequent database query involving the previously cached data, federated database system 230 may respond to the database query using the cached data from graph database 240 rather than re-retrieving and integrating the appropriate data and associated relationships from the respective data sources 252.

In the illustrated embodiment, data sources 252 collectively define a database schema with tables 254 representing school districts, schools, teachers, and students. The database schema also defines relationships that map schools to districts, teachers to schools, and students to teachers. The database schema may define these relationships, for example, using standard foreign key relationships. Based on this database schema, certain queries may be fairly straightforward. For example, it may be relatively simple to query for a student by name or a teacher of a particular student, given that the schema defines a relationship from students to teachers. However, other database queries may be more complex. For example, assume federated database system 230 receives a database query to identify all the teachers in a school district of a particular student. In the illustrated embodiment, federated database system 230 must first query for the student, then for the student's teacher, then for the teacher's school, then for the school district of that school, then for all schools in that district, and finally for all teachers from each school in that district. This may be a relatively time-consuming query, particularly if executed frequently. In some embodiments, the performance of responding to database queries may be improved by modifying the database schema to include additional database tables 254 to explicitly define new relationships among the data. For example, additional tables 254 could be added to the database schema of the illustrated embodiment to define relationships from students to school districts and school districts to teachers. In this manner, federated database system 230 may only need to query for the student, the student's school district, and then the teachers in that district. However, creating additional tables 254 in this manner may be time-consuming, particularly if the data set is large, and may also require additional storage space. Additionally, because the database schema must be modified, it must be known beforehand which relationships (e.g., the relationships from school districts to teacher and student to school districts) are important. In some embodiments, the performance of responding to database queries may be improved by leveraging a graph database 240. In such embodiments, the data and associated relationships that are retrieved in response to a database query may be cached in a graph database 240 and the cached data may be re-used to respond to subsequent database queries.

In the illustrated embodiment, a graph database 240 is leveraged to improve the performance of responding to database queries. The illustrated embodiment portrays the processing of a database query for all the teachers in a school district of a particular student. Initially, graph database 240 may be empty. Upon receiving the database query, federated database system 230 may first consult graph database 240 to determine whether the data necessary to respond to that query has already been cached in graph database 240. Because graph database 240 may initially be empty, graph database 240 may not yet contain the data necessary to respond to the database query. If it is determined that graph database 240 does not contain the data necessary to respond to the database query, federated database system 230 may retrieve the data from the appropriate data sources 252 in the manner discussed above by first querying for the student, then for the student's teacher, then for the teacher's school, then for the school district of that school, then for all schools in that district, and finally for all teachers from each school in that district. Federated database system 230 may then cache the data and associated relationships from each sub-query into graph database 240. For example, after querying for the student, referred to as student A in the illustrated embodiment, federated database system 230 may cache student A in graph database 240 by inserting a node 242A representing student A into graph database 240. Next, federated database system 230 may query for the teacher of student A and may determine that teacher B is the teacher of student A. Federated database system 230 may then cache this information by inserting a node 242B representing teacher B into graph database 240 and inserting an edge 244 from student A to teacher B to represent the student to teacher relationship. Next, federated database system 230 may query for the school of teacher B and may determine that teacher B works at school C. Federated database system 230 may then cache this information by inserting a node 242C representing school C into graph database 240 and inserting an edge 244 from teacher B to school C to represent the teacher to school relationship. Next, federated database system 230 may query for the district of school C and may determine that school C is in district D. Federated database system 230 may then cache this information by inserting a node 242D representing district D into graph database 240 and inserting an edge 244 from school C to district D to represent the school to district relationship. Next, federated database system 230 may query for all schools in district D and may determine that school C and school E are the only two schools in district D. Because school C may have previously been cached in graph database 240, federated database system 230 may not need insert a new node representing school C. Rather, federated database system 230 may cache the retrieved information by inserting a node 242E representing school E into graph database 240 and inserting edges 244 from district D to schools C and E to represent the district to school relationships. Next, federated database system 230 may query for all teachers from each school in district D (i.e., schools C and E) and may determine that teachers B and F are the only teachers at school C, and teachers G and H are the only teachers at school E. Because teacher B may have previously been cached in graph database 240, federated database system 230 may not need to insert a new node representing teacher B. Rather, federated database system 230 may cache the queried information by inserting nodes 242F, 242G, and 242H into graph database 240 to represent teachers F, G, and H, respectively, along with edges 244 from school C to teachers B and F and from school E to teachers G and H to represent the school to teacher relationships. Federated database system 230 has now retrieved and cached the data necessary to respond to the original database query of identifying all teachers in the school district of student A (i.e., teachers B, F, G, and H). Upon receiving the next database query, federated database system 230 may consult graph database 240 to determine whether the data necessary to respond to that query has already been cached in graph database 240. If the data necessary to respond to the query has already been cached in graph database 240, federated database system 240 may respond to the query using the cached data. If the data necessary to respond to the query has not already been cached in graph database 240, federated database system 230 may retrieve the data from the appropriate data sources 252 and may cache the retrieved data and associated relationships in graph database 240. In this manner, graph database 240 may continuously accumulate data retrieved in response to database queries and federated database system 230 may continue to respond to database queries using data cached in graph database 240 when available.

Figure 3:
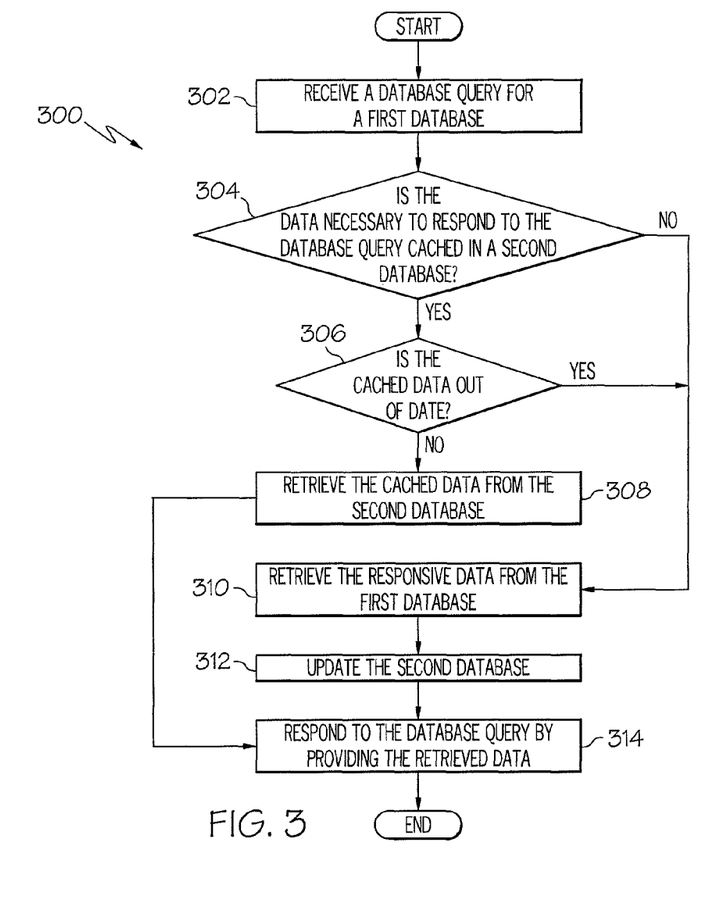
FIG. 3 illustrates a flowchart of a method for leveraging graph databases in a database system, in accordance with a particular embodiment.

FIG. 3 illustrates a flowchart, designated generally by reference number 300, of an example embodiment of a method for leveraging graph databases in a database system. Method 300 may be implemented, for example, using any of the systems of FIGS. 1 and 2 and/or any other suitable system.

The method may begin at step 302 where a database query for a first database may be received by a database system. In some embodiments, the first database may be a federated database capable of integrating data from various different data sources into a single virtual database of federated data. In other embodiments, the first database may be a relational or object relational database. At step 304, it may be determined whether the data necessary to respond to the database query is cached in a second database. The second database may comprise, for example, a graph database. The second database may be used to cache data retrieved in response to database queries for the first database and to respond to subsequent database queries using the cached data rather than re-retrieving the data from the first database. In particular embodiments, the second database may also comprise a virtual relationship table that defines relationships among the data stored on the data sources. In such embodiments, the relationships associated with data retrieved in response to database queries for the first database may also be cached in the virtual relationship table. Additionally, new relationships may be defined using the virtual relationship table. In this manner, when determining at step 304 if the data necessary to respond to the database query is cached in the second database, the database system may first query the virtual relationship table to determine whether the database query is requesting a relationship that is explicitly represented in the virtual relationship table. If the database query is requesting a relationship that is explicitly represented in the virtual relationship table, the database system may determine that the data necessary to respond to the database query is cached in the second database. If the database query is requesting a relationship that is not explicitly represented in the virtual relationship table, the database system may query the graph database to determine if the relationship is implicitly represented in the graph database. If the relationship is implicitly represented in the graph database, the database system may determine that the data necessary to respond to the database query is cached in the second database. If the relationship is not explicitly represented in the virtual relationship table or implicitly represented in the graph database, the database system may determine that the data necessary to respond to the database query is not cached in the second database. If it is determined at step 304 that the data necessary to respond to the database query is not cached in the second database, the method may proceed to step 310.

If it is determined at step 304 that the data necessary to respond to the database query is cached in the second database, then at step 306 it may be determined whether the cached data is out of date. The cached data may be out of date if the underlying data stored on the first database is updated or modified. In some embodiments, the cached data may become out of date after it has been cached for a pre-determined amount of time. In other embodiments, a publish-subscribe model may be implemented to determine when the cached data is out of date. In such embodiments, the database system may "subscribe" to certain data from the first database that has been cached in the second database, and when that data is updated and/or modified, the first database may "publish" the updated data by notifying all subscribers, such as the database system, that the data has been updated. If it is determined at step 306 that the cached data is not out of date, then at step 308 the cached data may be retrieved from the second database. In embodiments where the second database comprises a virtual relationship table and a graph database, the cached data may be retrieved from the virtual relationship table and/or the graph database, as appropriate. The method may then proceed to step 314, where the database query may be responded to by providing the cached data.

If it is determined at step 304 that the data necessary to respond to the database query is not cached in the second database, or if it is determined at step 306 that the cached data is out of date, then the method may proceed to step 310. At step 310, the data necessary for responding to the database query may be retrieved from the first database, and at step 312, the second database may be updated to cache the data retrieved from the first database. At step 314, the database query may then be responded to by providing the data retrieved from the first database. The method may restart at step 302 upon receiving another database query for the first database. In this manner, the second database may continuously accumulate data retrieved from the first database and the database system may respond to database queries using data cached in the second database when available.

The flowchart and block diagrams in FIGS. 1-3 illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method, comprising:
   receiving a database query for a database system that comprises a first database, a second database and a virtual relationship table, wherein the second database is a graph database and the first database is a different type of database than the second database;
   querying the virtual relationship table to determine whether the database query is requesting a relationship that is explicitly represented in the virtual relationship table;
   in response to determining that the database query is requesting a relationship that is explicitly represented in the virtual relationship table, using primary keys in the virtual relationship table to query for corresponding nodes in the graph database;
   in response to determining that the database query is requesting a relationship that is not explicitly represented in the virtual relationship table, querying the graph database to determine whether the relationship is implicitly represented in the graph database;
   retrieving responsive data from a memory device associated with the second database; and
   responding to the database query by providing the responsive data.

2. The method of claim 1, wherein the first database comprises a federated database capable of integrating multiple data sources.

3. The method of claim 1, further comprising retrieving the responsive data from a memory device associated with the first database in response to determining that the relationship is not implicitly represented in the graph database.

4. The method of claim 3, further comprising updating the second database to store the responsive data retrieved from the memory device associated with the first database.

5. The method of claim 1, further comprising updating the virtual relationship table to reflect an additional explicit relationship in response to determining that the relationship is implicitly represented in the graph database.

6. The method of claim 1, further comprising determining whether the data contained in the second database is out of date.

7. The method of claim 6, wherein determining whether the data contained in the second database is out of date comprises receiving a notification that corresponding data contained in the first database has been updated.

8. The method of claim 6, wherein determining whether the data contained in the second database is out of date comprises determining whether the data contained in the second database has been updated within a defined amount of time.

9. The method of claim 1, wherein the virtual relationship table stores object relationships among objects of data stored on data sources available to the database system including a map of a primary key for a particular row in a table of data to a second primary key for a second particular row in a second table through a named relationship.

10. A system, comprising:
    an interface operable to:
      receive a database query for database system that comprises a first database, a second database and a virtual relationship table, wherein the second database is a graph database and the first database is a different type of database than the second database;
    a processor operable to:
      query the virtual relationship table to determine whether the database query is requesting a relationship that is explicitly represented in the virtual relationship table;
      in response to determining that the database query is requesting a relationship that is explicitly represented in the virtual relationship table, use primary keys in the virtual relationship table to query for corresponding nodes in the graph database;
      in response to determining that the database query is requesting a relationship that is not explicitly represented in the virtual relationship table, query the graph database to determine whether the relationship is implicitly represented in the graph database;
      retrieve responsive data from a memory device associated with the second database; and
      respond to the database query by providing the responsive data.

11. The system of claim 10, wherein the first database comprises a federated database capable of integrating multiple data sources.

12. The system of claim 10, wherein the processor is further operable to retrieve the responsive data from a memory device associated with the first database in response to determining that the relationship is not implicitly represented in the graph database.

13. The system of claim 12, wherein the processor is further operable to update the second database to store the responsive data retrieved from the memory device associated with the first database.

14. The system of claim 10, wherein the processor is further operable to update the virtual relationship table to reflect an additional explicit relationship in response to determining that the relationship is implicitly represented in the graph database.

15. The system of claim 10, wherein the processor is further operable to determine whether the data contained in the second database is out of date.

16. The system of claim 15, wherein the processor operable to determine whether the data contained in the second database is out of date comprises the processor operable to receive a notification that corresponding data contained in the first database has been updated.

17. The system of claim 15, wherein the processor operable to determine whether the data contained in the second database is out of date comprises the processor operable to determine whether the data contained in the second database has been updated within a defined amount of time.

18. The system of claim 10, wherein the virtual relationship table stores object relationships among objects of data stored on data sources available to the database system including a map of a primary key for a particular row in a table of data to a second primary key for a second particular row in a second table through a named relationship.

19. A computer program product comprising a non-transitory computer readable storage medium having computer readable program code embodied therewith, the computer readable program code comprising:
    computer readable program code configured to receive a database query for a database system that comprises a first database, a second database and a virtual relationship table, wherein the second database is a graph database and the first database is a different type of database than the second database;

computer readable program code configured to query the virtual relationship table to determine whether the database query is requesting a relationship that is explicitly represented in the virtual relationship table;

computer readable program code configured to, in response to determining that the database query is requesting a relationship that is explicitly represented in the virtual relationship table, use primary keys in the virtual relationship table to query for corresponding nodes in the graph database;

computer readable program code configured to, in response to determining that the database query is requesting a relationship that is not explicitly represented in the virtual relationship table, query the graph database to determine whether the relationship is implicitly represented in the graph database;

computer readable program code configured to retrieve responsive data from a memory device associated with the second database; and computer readable program code configured to respond to the database query by providing the responsive data.

20. The computer program product of claim 19, wherein the first database comprises a federated database capable of integrating multiple data sources.

21. The computer program product of claim 19, wherein the computer readable program code further comprises computer readable program code configured to retrieve the responsive data from a memory device associated with the first database in response to determining that the relationship is not implicitly represented in the graph database.

22. The computer program product of claim 21, wherein the computer readable program code further comprises computer readable program code configured to update the second database to store the responsive data retrieved from the memory device associated with the first database.

23. The computer program product of claim 19, wherein the computer readable program code further comprises computer readable program code configured to update the virtual relationship table to reflect an additional explicit relationship in response to determining that the relationship is implicitly represented in the graph database.

24. The computer program product of claim 19, wherein the computer readable program code further comprises computer readable program code configured to determine whether the data contained in the second database is out of date.

25. The computer program product of claim 24, wherein computer readable program code configured to determine whether the data contained in the second database is out of date comprises computer readable program code configured to receive a notification that corresponding data contained in the first database has been updated.

26. The computer program product of claim 24, wherein computer readable program code configured to determine whether the data contained in the second database is out of date comprises computer readable program code configured to determine whether the data contained in the second database has been updated within a defined amount of time.

27. The computer program product of claim 19, wherein the virtual relationship table stores object relationships among objects of data stored on data sources available to the database system including a map of a primary key for a particular row in a table of data to a second primary key for a second particular row in a second table through a named relationship.

* * * * *